Feb. 3, 1970    G. SCHWARTZMAN    3,493,643
METHOD FOR MAKING RESILIENT FOAM APPLICATORS
Original Filed June 28, 1965    2 Sheets-Sheet 1
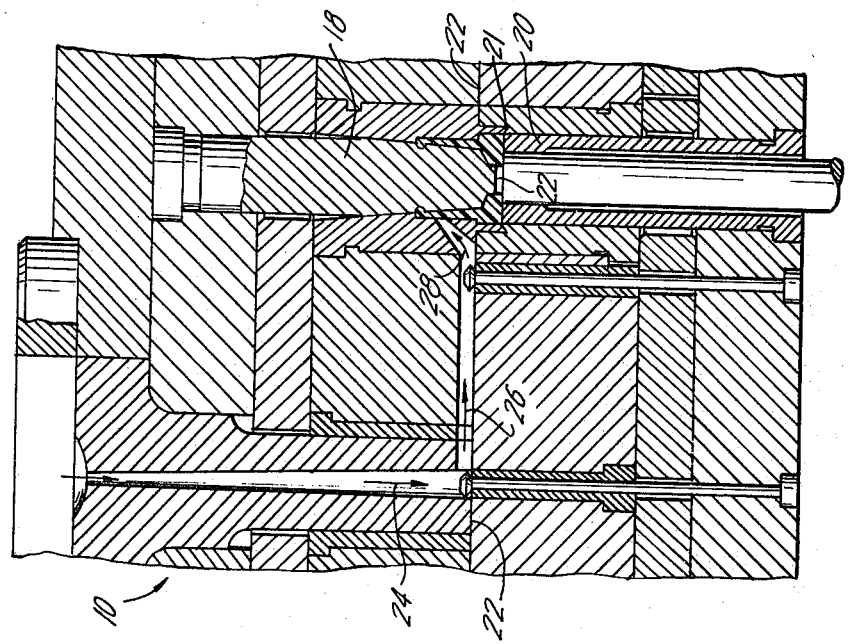
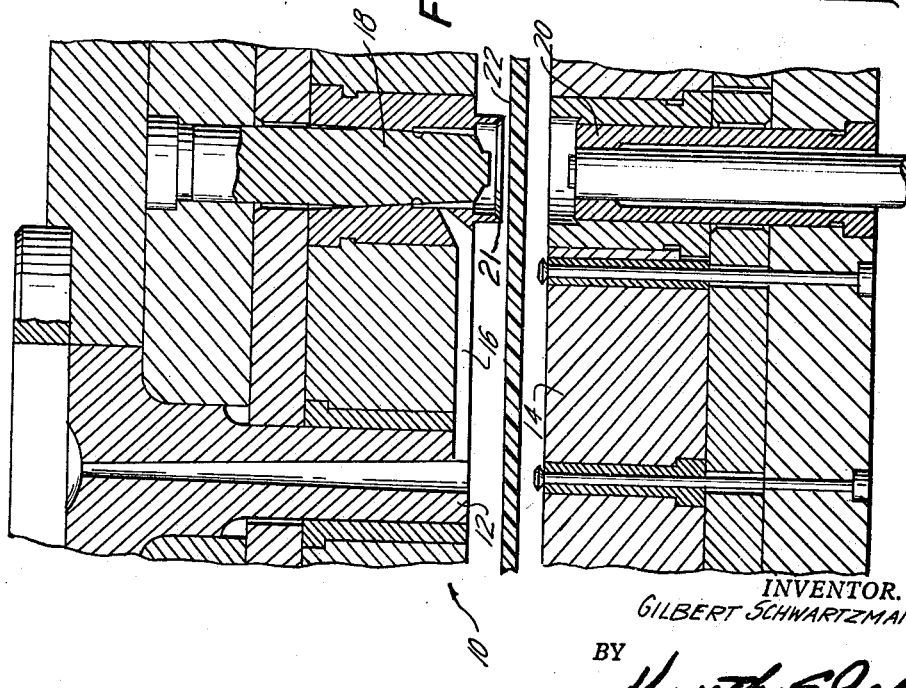
INVENTOR.
GILBERT SCHWARTZMAN
BY
ATTORNEYS Feb. 3, 1970   G. SCHWARTZMAN   3,493,643
METHOD FOR MAKING RESILIENT FOAM APPLICATORS
Original Filed June 28, 1965   2 Sheets-Sheet 2

INVENTOR.
GILBERT SCHWARTZMAN
BY
Kenneth S. Goepel
ATTORNEYS

United States Patent Office 3,493,643
Patented Feb. 3, 1970

1

3,493,643
METHOD FOR MAKING RESILIENT FOAM APPLICATORS
Gilbert Schwartzman, 20 Wilmot Circle, Scarsdale, N.Y. 10583
Original application June 28, 1965, Ser. No. 467,780. Divided and this application Apr. 26, 1967, Ser. No. 633,890
Int. Cl. B29f 1/10; B29h 9/00; B29d 31/00
U.S. Cl. 264—138                              4 Claims

ABSTRACT OF THE DISCLOSURE

The process of the present invention comprises the steps of placing porous resilient foam material in an open mold. The mold is then closed compressing the resilient foam material. Then, plastic is injected into the mold so that it is integrally united with the porous resilient foam material. Thereafter, the foam material integrally united with the plastic material is cut to shape and employed on applicators.

---

This invention relates to a method of molding an applicator for applying and dispensing liquids of various viscosities and is a division of application Ser. No. 467,780 filed June 28, 1965 and now U.S. Patent No. 3,368,232 for "Applicator and Process of Manufacture Thereof."

In the past, various types of applicators and daubers have been devised which employ valve mechanisms for controlling and metering the flow of fluid onto an applicator surface which may employ a foam rubber reservoir for the fluid as well as a cover which in the past has generally been a two-ply fabric. One or more layers of the foam rubber are utilized and are held in place by the cover which is stretched over the foam rubber and the swaged into position by a flange of a retainer ring, which provides an attractive and useful applicator, but then swaged into position by a flange of a retainer ring, tion is time consuming and costly.

There has been a long and intensive search for suitable materials for new applicator surfaces and for means of attaching these materials to the body of the applicator. Various types of mountings, swaging, riveting, fastening and the like have been attempted, but all have proven insufficient. The concept of this invention features the integal uniting of resilient urethane foam within a mold with a polyethylene retainer ring in a unique manner. While urethane foam has been found suitable, ordinary foam rubber or other low melting point foam materials cannot be used in the present invention, and the integral uniting of the housing urethane foam with the applicator only occurs when polyethylene or other similar thermoplastic resins are employed.

It is an object of the present invention to provide a method of making an applicator in which a resilient urethane foam or similar high melting point porous sponge-like foam is integrally united with a polyethylene retainer ring so that not only will the top surface of the foam be available for use as an applicator surface, but the entire peripheral sides will likewise be available for use in applying various types of fluid thereby better enabling the fluid to be placed in crevices, cracks and the like, such as when applying shoe polish on shoes or applying medications on the body of a human being.

Another object of the invention resides in the provision of a method of making an applicator which employs porous material integrally united with and in combination with a plastic retainer ring so that the peripheral edge of the top surface is free enabling the edge to be used in applying fluid into various tight places.

Another object of the invention resides in the provision of a method of making an applicator that is simple in construction, extremely inexpensive to utilize, and which is provided with a novel initial seal, but which after the first use thereof enables the ready application of fluid.

Briefly, the concept of this invention includes the steps of placing porous material in an open mold. The mold is then closed compressing the resilient foam material. Then, plastic material is injected into the mold so that it integrally unites with the porous material. The porous material is selected from a group consisting of urethane foam and cellulose foam materials and a suitable low melting point thermoplastic such as polyethylene or the like.

In further carrying out the invention, heated knives may be used to cut slots in the retainer ring so that these knives will cut through the web of the retainer ring, and upon withdrawal, the heated cuts will provide a frangible liquid-tight initial seal until such time as the dauber is first utilized by depressing the dome-shaped web of the applicator and thereby cracking open the cuts.

These, together with the various ancillary objects and features of the invention, which will become apparent as the following description proceeds, are attained by this new process of manufacturing applicators and by the applicators resulting therefrom, the steps of the process and preferred embodiments of the applicator being shown in the accompanying drawings, by way of example only, wherein:

FIG. 1 is a partial sectional view of pertinent parts of an injection molding apparatus showing the mold open with a sheet of porous material inserted between the halves of the mold;

FIG. 2 is a view similar to FIG. 1, but showing the mold in a closed position prior to injection of liquid polyethylene;

Figure 3:
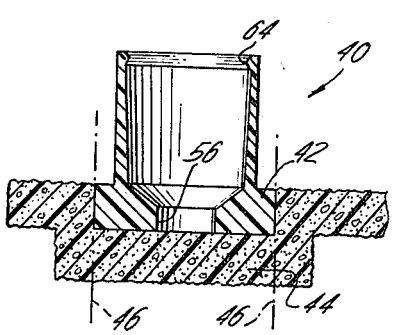
FIG. 3 is a sectional detail view illustrating an applicator manufactured in accordance with the concepts of the present invention shown prior to cutting off of the applicator from the sheet of porous material.

With continuing reference to the accompanying drawings, wherein like reference numerals designate similar parts throughout the various views, reference numeral 10 is used to generally designate an injection molding apparatus having two main mold parts 12 and 14 which are so arranged as to cooperate to form the mold for the applicator. The mold half 12 includes a channel 16 for forming a sprue for injecting molten polyethylene at a temperature of approximately 400 degrees into the mold. The mold halves 12 and 14 includes cooperating core pieces 18 and 20 so designed that the final shape of the portions molded of polyethylene are predetermined by the shape of the core pieces.

A sheet of porous material 22 is inserted between the mold halves. This porous material is urethane foam. It has been found that ordinary foam rubber and various other materials are definitely unsuitable for this process, the material especially adapted being porous urethane foam with or without a backing of nylon tricot material.

The core pieces may include knife edges 21 for the purpose of cutting the sheet of porous material.

After the porous material 22 has been inserted between the mold halves 12 and 14 the mold halves are closed severely compressing the porous material 22 into substantially a thin line except at the location of the core pieces 18 and 20 where it is very much compressed but not quite completely compressed as elsewhere in the mold. The reduced amount of compression at the location of the core pieces 18 and 20 gives rise to the unusual and unexpected result that there is with the integral uniting of the cellulose foam or urethane foam with molten polyethylene which is injected at approximately 400 degrees in the direction of arrows 24, 26, 28, into the space defined by the core pieces 18 and 20 respectively.

Then, the injection molding machine is opened and the partially completed applicator, which is generally indicated by reference numeral 40 is withdrawn. This partially completed applicator includes the molded polyethylene retainer ring integrally united with a web or covering 44 of the porous material. Then, the excess porous material is die cut from the retainer ring 42 along the line 46. Thereafter, a one-piece valve assembly 48 molded out of a suitable plastic material, such as polyethylene or polyurethane, is inserted into the retainer ring 42. The valve assembly 48 includes a valve head 50 having a tapered portion 52 corresponding with the tapered valve seat 54 formed by the tapered opening 56 in the retaining ring 42. Further, a plurality of resilient spring members 58 are integrally formed with the valve head and an enlarged ring 60 which is swaged in position as at 64. The valve head presses up into the web or covering 44 and the web 44 when depressed upon use of the applicator, depresses the valve head to allow fluid flow through the plurality of channels 64 formed in the valve head 50, so as to permit the entire web or covering 44 to become saturated with the fluid to be applied. It is particularly to be noted that the sides of the web 68 as well as the top 65 may be utilized for applying fluid. In cases where it is desired to apply shoe polish on shoes, the edge and side portions are very desirable for enabling application of fluid into crevices and the like. This is also true when applying fluid onto portions of the human body. The spring members 58 are of such characteristics as to normally hold the valve head 52 in a closed position against the valve seat 54.

In the case where knife edges 21 are provided, the foam material is cut to shape during the molding step.

Figure 6:
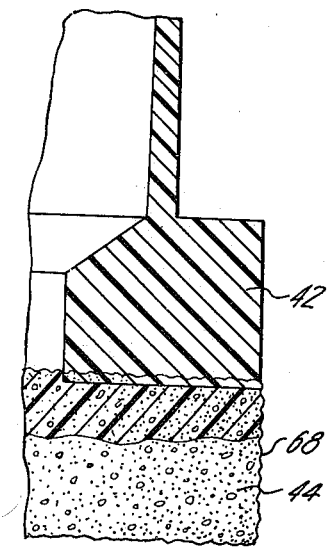
FIG. 6 is an enlarged sectional detail view illustrating the manner in which the porous material integrally unites with the polyethylene; and, FIG. 7 is an enlarged sectional detail view of another type of material which can be utilized within the concept of the present invention.
Figure 4:
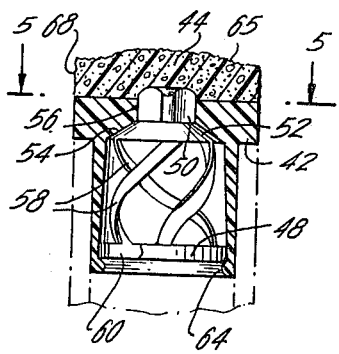
FIG. 4 is a sectional detail view of a completed applicator.
Figure 7:
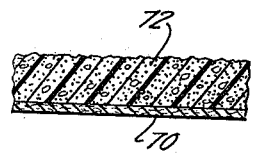
Figure 5:
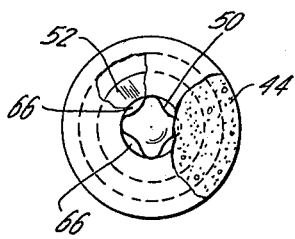
FIG. 5 is a transverse sectional view taken along the plane of line 5—5 in FIG. 4.

As can be seen in FIG. 6, the web 44 is integrally united to the polyethylene ring 42 with the polyethylene extending downwardly deep into the foam material and through the loops thereof. This uniting is more than a mechanical bonding, but includes an actual integration of the materials.

The polyethylene utilized is a specially cone-pointed rubber polyethylene—US 1634 Ultrathene.

It is possible to use a combination of foam material and fabric. The Urethane foam cellulose may be bonded to brushed nylon tricot or other pile-type fabric and the brushed nylon tricot fabric 70, see FIG. 6, may be mechanically bonded to the polyethylene during molding operation.

A latitude of modification, substitution and change is intended in the foregoing disclosure and in some instances, some features of the invention will be employed without a corresponding use of other features.

I claim:

1. A method of molding comprising the steps of inserting a sheet of flexible porous material taken from the group consisting of neoprene foam and urethane foam in an open injection molding apparatus, closing said apparatus and compressing part of said porous material and partially compressing the remainder of said porous material to a lesser extent than the compression of said part, injecting a molten plastic material into said apparatus and into contact with said remainder of said porous material, opening said mold and then removing the molded article therefrom.

2. A method of molding according to claim 1, wherein said plastic is polyethylene.

3. A method of molding according to claim 2, including cutting said porous material to a predetermined shape simultaneously with closing said apparatus.

4. A method according to claim 3, wherein the molten plastic is at a temperature of approximately 400° F.

References Cited

UNITED STATES PATENTS

| | | | |
|---|---|---|---|
| 2,728,950 | 1/1956 | Annesser | 264—284 X |
| 2,767,436 | 10/1956 | Noland et al. | |
| 2,811,744 | 11/1957 | Baldanza | 264—153 |
| 3,014,244 | 12/1961 | Hansjosten | 264—244 X |
| 3,085,024 | 4/1963 | Blackford. | |
| 3,150,220 | 9/1964 | Howell | 264—259 X |
| 2,666,954 | 1/1954 | Patter. | |

FOREIGN PATENTS

| | | |
|---|---|---|
| 1,257,185 | 2/1961 | France. |
| 344,823 | 4/1960 | Switzerland. |
| 741,918 | 12/1955 | Great Britain. |

ROBERT F. WHITE, Primary Examiner

T. J. CARVIS, Assistant Examiner

U.S. Cl. X.R.

18—36; 264—264, 266